United States Patent
Miura et al.

(10) Patent No.: US 10,237,159 B2
(45) Date of Patent: Mar. 19, 2019

(54) COMPUTER SYSTEM AND METHOD OF CONTROLLING COMPUTER SYSTEM

(71) Applicant: Hitachi, Ltd., Tokyo (JP)

(72) Inventors: Seiji Miura, Tokyo (JP); Junichi Miyakoshi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 15/593,731

(22) Filed: May 12, 2017

(65) Prior Publication Data

US 2017/0366436 A1 Dec. 21, 2017

(30) Foreign Application Priority Data

Jun. 16, 2016 (JP) ................................. 2016-119654

(51) Int. Cl.
*H04L 12/26* (2006.01)
*H04L 29/08* (2006.01)

(52) U.S. Cl.
CPC .............. *H04L 43/10* (2013.01); *H04L 43/16* (2013.01); *H04L 67/12* (2013.01)

(58) Field of Classification Search
CPC .......... H04L 43/10; H04L 67/12; H04L 43/16
See application file for complete search history.

(56) References Cited

U.S. PATENT DOCUMENTS

| | | | |
|---|---|---|---|
| 2008/0165727 A1* | 7/2008 | Xiaoben | H04W 16/04 370/329 |
| 2014/0233496 A1* | 8/2014 | Corinella | H04W 84/18 370/329 |
| 2015/0186056 A1 | 7/2015 | Miura et al. | |
| 2015/0215394 A1 | 7/2015 | Nemoto et al. | |
| 2016/0131381 A1* | 5/2016 | Schmidlin | H04L 67/101 700/277 |
| 2017/0270921 A1* | 9/2017 | Arslan | G06F 17/279 |

FOREIGN PATENT DOCUMENTS

| | | |
|---|---|---|
| JP | 2014-035717 A | 2/2014 |
| WO | 2014/038073 A1 | 3/2014 |

* cited by examiner

*Primary Examiner* — Abdullahi E Salad
(74) *Attorney, Agent, or Firm* — Mattingly & Malur, PC

(57) ABSTRACT

A large-scale computer system including a plurality of nodes is controlled to improve its system performance without aggregating data in a single site. There is provided a computer system including a plurality of computers, wherein a processor: detects a trigger to calculate a control value for controlling a process to be performed by the computer; identifies a target computer for which an evaluation value is obtained; calculates the evaluation value of its own computer; obtains the evaluation value from the target computer; calculates a first point using at least one of the evaluation value of its own computer and the evaluation value of the target computer; obtains a second point from the target computer; calculates the control value using the first point and the second point; and controls the process performed by the computer based on the control value.

12 Claims, 8 Drawing Sheets

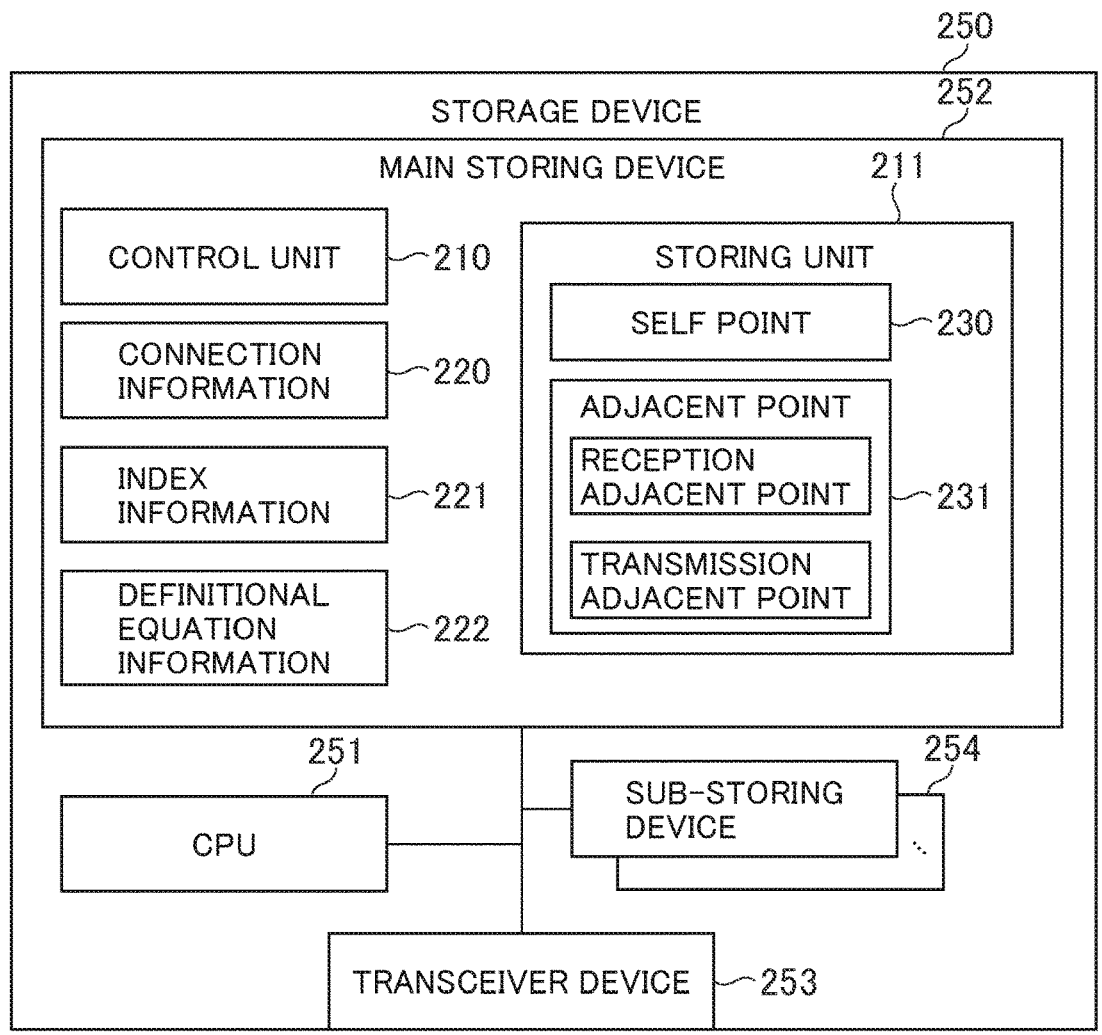

FIG. 3D

| NODE ID | CONNECTION NODE ID | STATE |
|---|---|---|
| V1 | V2 | NORMAL |
|  | V11 | NORMAL |
| V2 | V1 | NORMAL |
|  | V3 | NORMAL |
|  | V12 | NORMAL |
| V11 | V2 | NORMAL |
|  | V12 | NORMAL |
|  | V21 | NORMAL |
| ⋮ | ⋮ | ⋮ |

FIG. 4

| CONTROL ID | CONTROL VALUE TYPE | OBTAINED INDEX | TIMING |
|---|---|---|---|
| 1 | NUMBER OF REQUESTS PROCESSED (PROCESSING PERFORMANCE) | FREQUENCY, NUMBER OF CORES | CYCLE : 10 SEC |
| 2 | NUMBER OF REQUESTS (POWER EFFICIENCY) | FREQUENCY, NUMBER OF CORES, POWER CONSUMPTION | RECEIPT OF EXECUTION INSTRUCTION |
| 3 | AMOUNT OF WRITE DATA | DATA AMOUNT | RECEIPT OF I/O REQUEST |
| 4 | NUMBER OF REQUESTS TRANSFERRED | FREE RESOURCE AMOUNT | PROCESSING LOAD > THRESHOLD |
| ⋮ | ⋮ | ⋮ | ⋮ |

FIG. 5

| CONTROL ID | VALUE TYPE | DEFINITIONAL EQUATION | CALCULATED VALUE |
|---|---|---|---|
| 1 | SELF EVALUATION VALUE | DEFINITIONAL EQUATION 1-1 | XXX |
| 1 | TRANSMISSION ADJACENT POINT | DEFINITIONAL EQUATION 1-2 | XXY |
| 1 | RECEPTION ADJACENT POINT | DEFINITIONAL EQUATION 1-3 | XYY |
| 1 | SELF POINT | DEFINITIONAL EQUATION 1-4 | YYY |
| 1 | CONTROL VALUE | DEFINITIONAL EQUATION 1-5 | ZZZ |
| 2 | SELF EVALUATION VALUE | DEFINITIONAL EQUATION 2-1 | xxx |
| ⋮ | ⋮ | ⋮ | ⋮ |

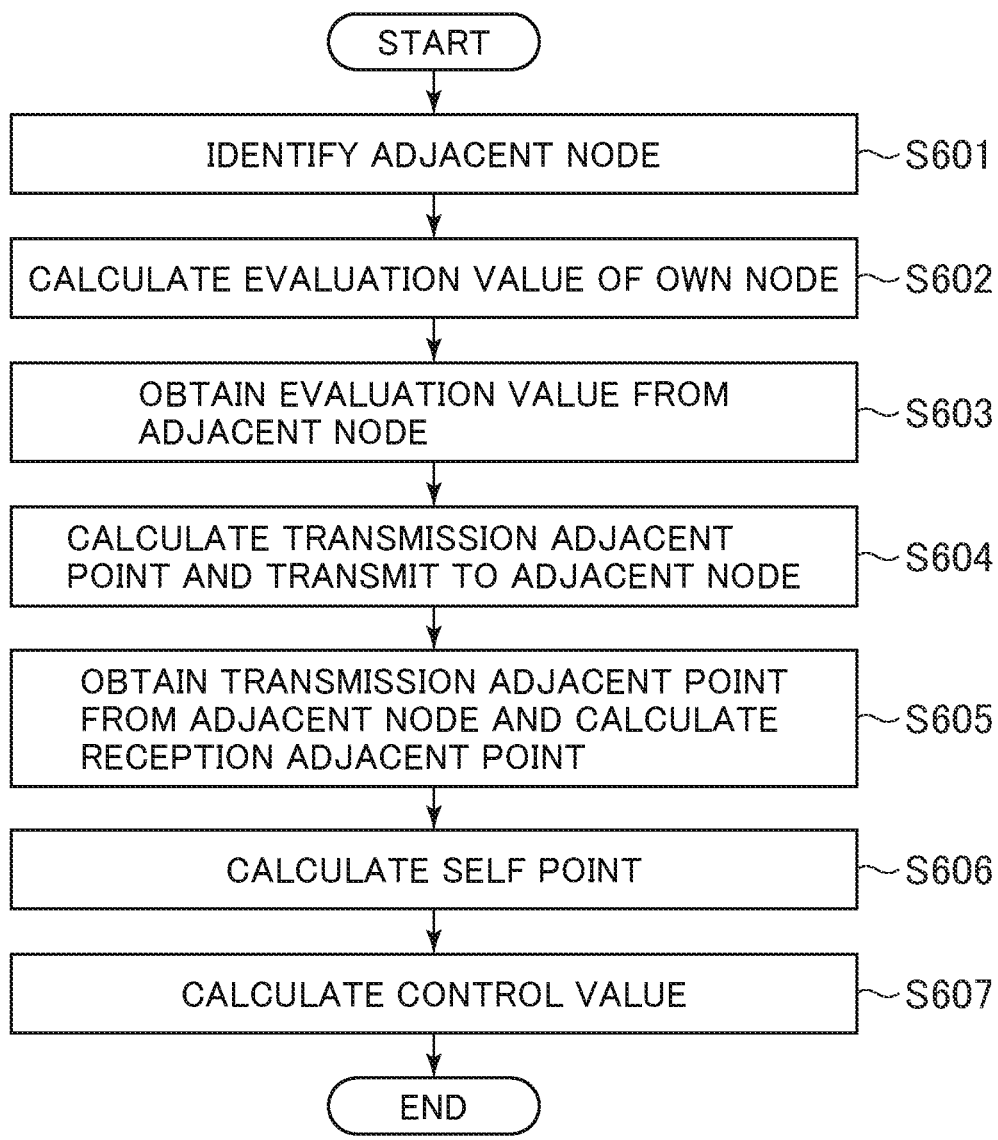

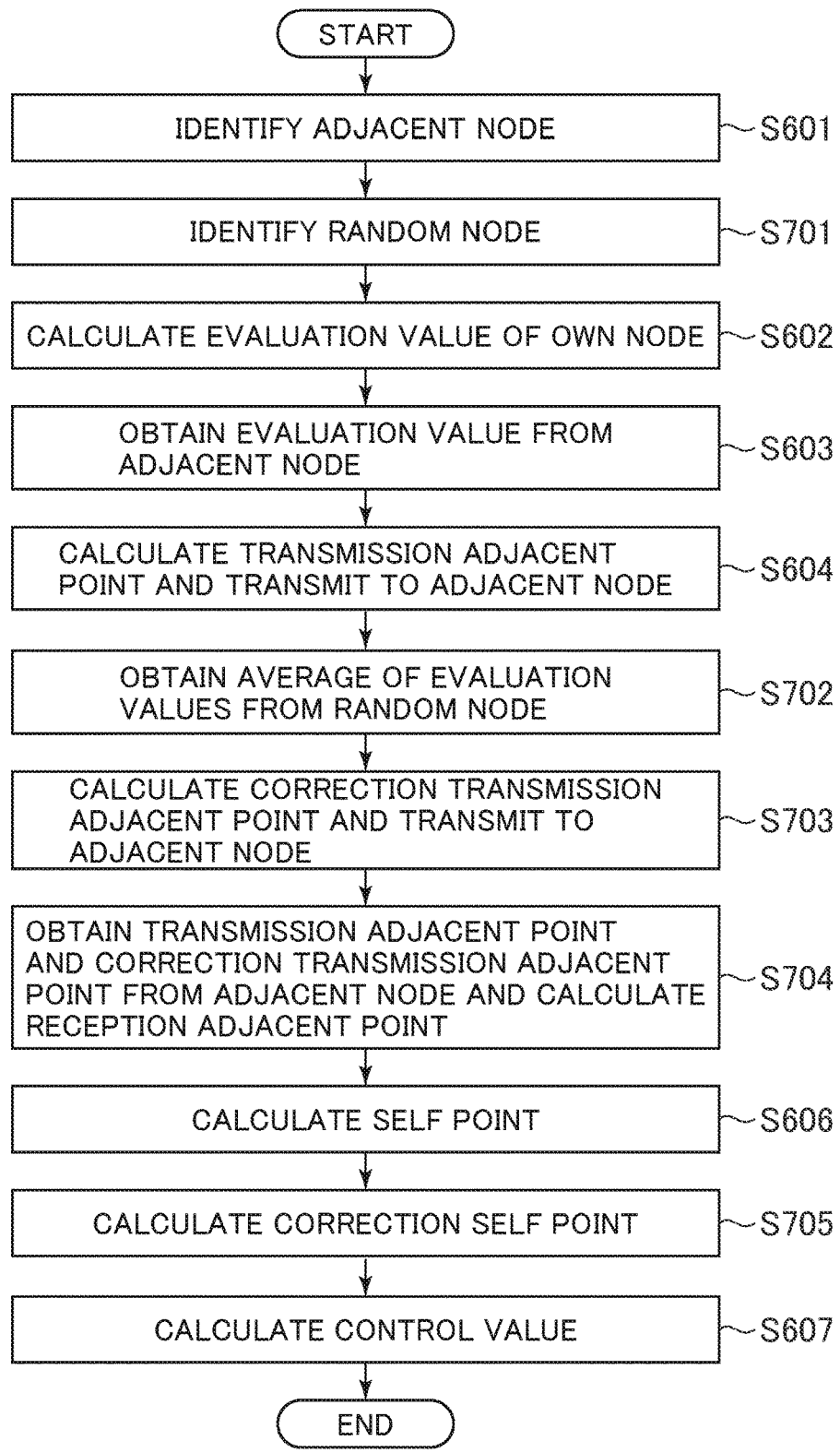

COMPUTER SYSTEM AND METHOD OF CONTROLLING COMPUTER SYSTEM

CLAIM OF PRIORITY

The present application claims priority from Japanese patent application JP 2016-119654 filed on Jun. 16, 2016, the content of which is hereby incorporated by reference into this application.

BACKGROUND

The present invention relates to a method of controlling a computer system constituted by a plurality of nodes.

Recently, big data analysis is attracting attention which collects a large amount of data obtained from e-mails, SNS, web sites, sensors and the like, analyzes the data, and thereby obtaining useful knowledge. To obtain the useful knowledge in the big data analysis, it is necessary to analyze the large amount of data at a high speed.

A data center that executes the big data analysis is constructed by a storage device that stores therein the large amount of data and many servers. Inclusion of many servers enables a fast analysis of the large amount of data. Moreover, a storage device incorporating an SSD (Solid State Drive) is used to achieve a fast access to the data.

With an increase in data volume, increased speed of data analysis and improved reliability of the storage device to continue the service are required. It is also required to increase the speed of data analysis while minimizing power consumption of the data center. Moreover, there is a need of taking into account a writing life of a non-volatile storing device such as an SSD. That is, it is required to control the data center (system) so as to achieve various purposes.

Techniques described in Japanese Unexamined Patent Application Publication No. 2014-35717 and WO 2014/038073 are known to optimize processing performance, load distribution, and the like in a computer system including many computers.

Japanese Unexamined Patent Application Publication No. 2014-35717 describes, "in given three hierarchies (n to n+2 hierarchies), one node in an n+1th hierarchy obtains load information from each of one or more nodes in an n+2th hierarchy, calculates a free resource amount of its own node based on the obtained load information and the load information of its own node, and transmits the calculated free resource amount of its own node to a node in an nth hierarchy; and the node in the nth hierarchy calculates a weighted value based on the free resource amount obtained from each node in the n+1th hierarchy, and distributes a received processing request to any node in the n+1th hierarchy based on the calculated weighted value."

Moreover, WO 2014/038073 describes, "Reliability is improved and longevity is extended in a storing device system comprising a plurality of memory modules including a non-volatile memory. For this purpose, the plurality of memory modules (STG) notify a control circuit DKCTL0 of a write data amount (Wstg) actually written to the internal write data amount. The control circuit DKCTL0 calculates an estimated write data amount (eWd) of each memory module from the write data amount (Wstg), a write data amount (Wh2$d$) for a write command already issued to the plurality of memory modules, and a write data amount (ntW) for the next write command. The next write command is then issued to a memory module having the least estimated write data amount."

SUMMARY

In an age of IoT, an amount of data processed by a data center increases dramatically. To dramatically improve the processing capability, it is necessary to drastically increase the number of servers and SSDs in the data center.

The methods described in Japanese Unexamined Patent Application Publication No. 2014-35717 and WO 2014/038073 need to collect information required for controlling the system such as free resource information and write data amount from all elements (server, SSD, and the like) and aggregate it in a single site. Thus, increasing the number of the servers and the SSDs may give rise to the following problems.

One problem would be a difficulty in real-time correspondence due to extended time for collecting data. Another problem would be an increase in communication load for collecting data and arithmetic processing load.

The present invention is made in view of the problems described above. The present invention provides a method for controlling a system with a low cost, in real time, for the purpose of improving the processing capability and the like, even when the amount of data to be collected increases, and such a system.

A typical example of the invention disclosed herein is described below. There is provided a computer system including a plurality of computers connected to one another via a network, wherein each of the plurality of computers includes a processor, a storing device connected to the processor, and a network interface connected to the processor, and the processor: detects a trigger to calculate a control value for controlling a process to be performed by the computer; identifies a target computer for which an evaluation value is obtained to calculate the control value; calculates the evaluation value of its own computer and stores the evaluation value of the own computer in the storing device; obtains the evaluation value from the target computer and stores the evaluation value of the target computer in the storing device; calculates a first point indicative of relative performance of the own computer in the computer system using at least one of the evaluation value of the own computer and the evaluation value of the target computer and stores the first point in the storing device; calculates a second point indicative of relative performance of the target computer in the computer system based on a comparison processing using the evaluation value of the own computer and the evaluation value of the target computer and transmits the second point to the target computer; obtains the second point from the target computer and stores the second point obtained from the target computer in the storing device; calculates the control value using the first point and the second point stored in the storing device and stores the calculated control value in the storing device; and controls the process performed by the computer based on the control value.

According to one aspect of the present invention, it is possible to control a computer system with a low cost, in real time, and for the purpose of improving the processing capability and the like. Other problems, configurations, and effects than those described above will become apparent from the following description of embodiments.

BRIEF DESCRIPTION OF THE DRAWINGS

FIG. 2B shows a specific exemplary configuration of a node included in the computer system according to the first embodiment;

FIG. 3A shows an example of connection information according to the first embodiment;

FIG. 3D shows an example of connection information according to the first embodiment;

FIG. 4 shows an example of index information according to the first embodiment;

FIG. 5 shows an example of definitional equation information according to the first embodiment;

FIG. 6 is a flowchart illustrating a control content determination processing performed by a control unit according to the first embodiment; and FIG. 7 is a flowchart illustrating a control content determination processing performed by a control unit according to a fifth embodiment.

DETAILED DESCRIPTION

Embodiments of the present invention will be described below with reference to accompanying drawings. It should be noted that the embodiments are merely given as examples to embody the invention but not intended to limit the technical scope of the invention in any ways. Like numerals indicate like components throughout the figures.

First Embodiment

Described in a first embodiment are a configuration and a processing as the basis of the present invention.

Figure 1:
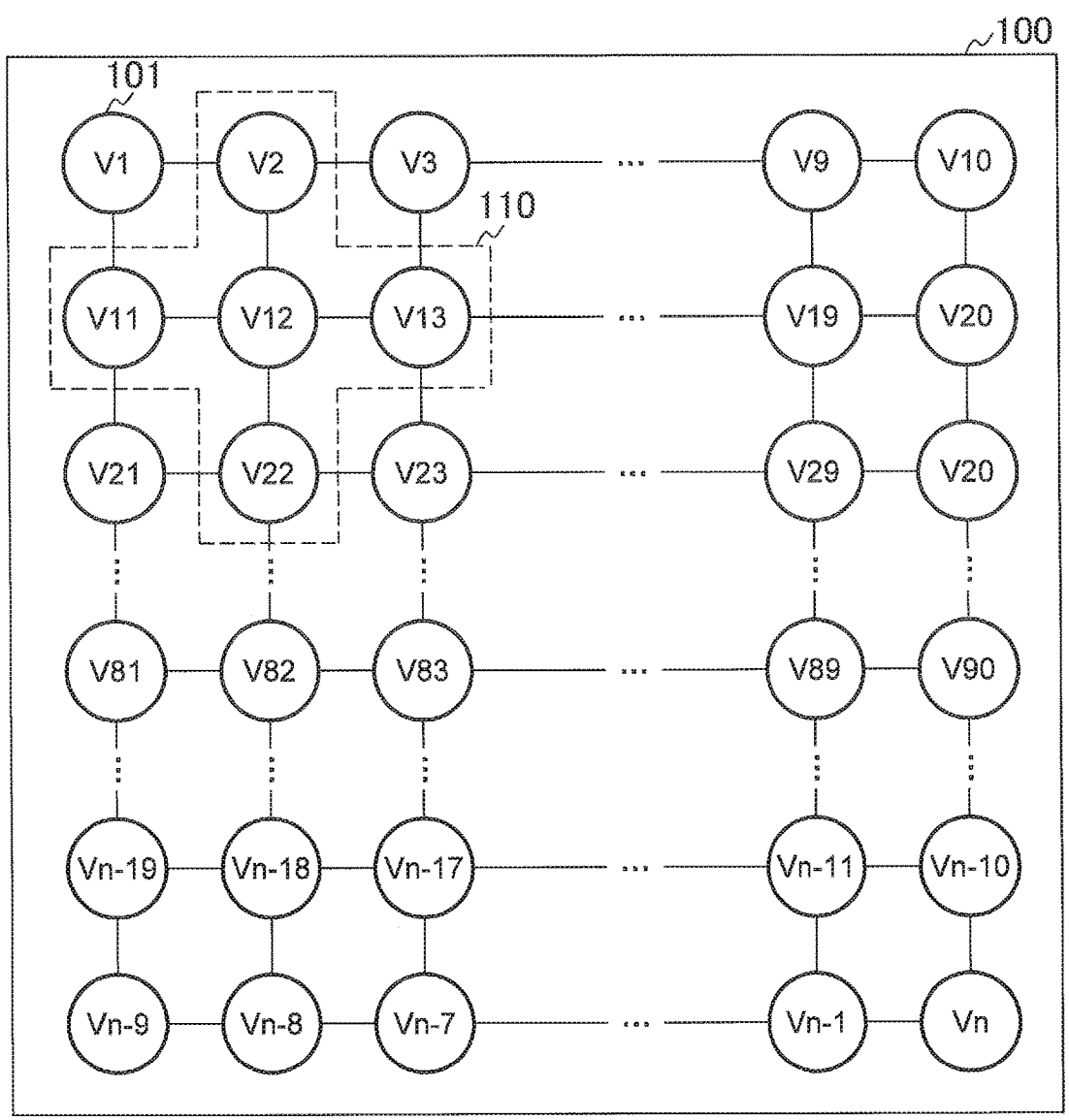
FIG. 1 shows an exemplary configuration of a computer system according to a first embodiment.
Figure 2A:
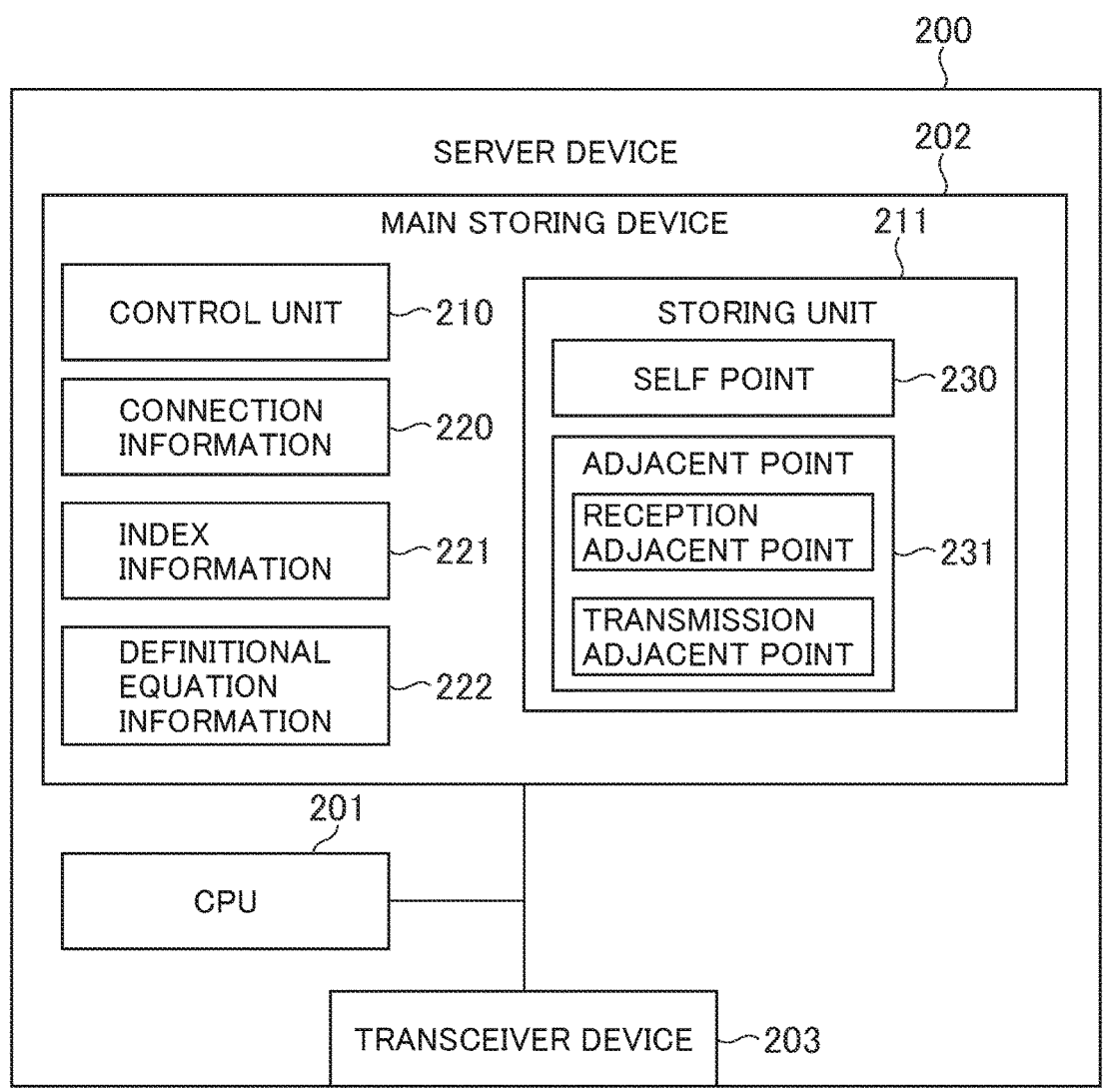
FIG. 2A shows a specific exemplary configuration of a node included in the computer system according to the first embodiment.

FIG. 1 shows an exemplary configuration of a computer system according to the first embodiment. FIGS. 2A and 2B show specific exemplary configurations of a node included in the computer system according to the first embodiment.

A computer system 100 includes a plurality of nodes 101. The plurality of nodes 101 are connected to one another via a network. The network may be LAN (Local Area Network), WAN (Wide Area Network), and the like. It should be noted that this embodiment is not limited to any type of network. The network connection may be wireless or wired.

In FIG. 1, the nodes 101 are connected in a grid pattern. Note that this embodiment is not limited to the connection pattern of the nodes 101 but the nodes may be connected in a torus structure.

An outline of the processing in this embodiment is described below. Each node 101 included in the computer system 100 obtains an evaluation value from a node 101 within a predetermined evaluation area 110. Each node 101 calculates a point for determining a control value based on the evaluation value, and determines the control value for controlling the processing based on the point.

The control value herein is a value for controlling the processing performed by the node 101. The point herein is a value indicative of a relative performance of each node 101.

The node 101 is a device that performs a predetermined processing. Now, specific examples of the node 101 are given using FIGS. 2A and 2B. FIG. 2A shows a configuration of a server device 200 included in a system used for big data analysis and the like. FIG. 2B shows a configuration of a storage device 250 included in a storage system.

First, the configuration of the server device 200 is described with reference to FIG. 2A. The server device 200 includes a CPU 201, a main storing device 202, and a transceiver device 203. These components are connected to one another via an internal bus and the like.

The CPU 201 executes a program stored in the main storing device 202. By the CPU 201 executing the program, a function of the server device can be embodied. In the following description, when explanation is given using a module as a subject, it means that the CPU 201 executes the program that embodies the corresponding module.

The main storing device 202 stores therein the program executed by the CPU and information used by the program. The main storing device 202 in this embodiment stores therein the program that embodies a control unit 210. The main storing device 202 includes a storing unit 211 serving as a storage area for storing various values calculated by the control unit 210. The main storing device 202 also stores therein connection information 220, index information 221, and definitional equation information 222.

The control unit 210 determines the control value of the node 101, and controls the node 101 based on the corresponding control value. The control unit 210 may be a module included in an unshown OS (Operating System) or an application operating on the OS.

The connection information 220 is information for managing a connection relation between nodes 101. The connection information 220 is described in detail with reference to FIG. 3. The index information 221 is information for managing an index used to calculate the control value. The index information 221 is described in detail with reference to FIG. 4. The definitional equation information 222 is information for managing a definitional equation to calculate the control value. The definitional equation information 222 is described in detail with reference to FIG. 5.

The storing unit 211 stores therein a self-point 230 and an adjacent point 231. The self-point 230 and the adjacent point 231 are used to determine the control value. The adjacent point includes a transmission adjacent point that the node 101 transmits to another node 101 via the transceiver device 203 and a reception adjacent point that the node 101 receives from another node 101 via the transceiver device 203.

It should be noted that the storing unit 211 may store therein other data than the self-point 230 and the adjacent point 231. For example, the storing unit 211 may store therein a hop count to search for the node 101 included in the evaluation area 110. Hereinafter, the node 101 included in the evaluation area 110 may also be referred to as an adjacent node 101.

The transceiver device 203 receives a request and data from the node 101 or an external device, and transmits the request and data to the node 101 or the external device. Note that the server device 200 may include a plurality of transceiver devices 203. For example, the server device may receive and transmit a self-evaluation value, the adjacent point, and the like using one transceiver device 203, and receives and transmits the request and the like using one transceiver device 203. This can improve the processing performance and the like.

In this embodiment, the transceiver device 203 connects the nodes 101 to form a network. The network connection method may be wireless or wired.

Next, the configuration of the storage device 250 is described with reference to FIG. 2B. The storage device 250 includes a CPU 251, a main storing device 252, a transceiver device 253, and a sub-storing device 254. These components are connected to one another via an internal bus and the like.

The CPU 251, the main storing device 252, and the transceiver device 253 are hardware like the CPU 201, the main storing device 202, and the transceiver device 203. The sub-storing device 254 is a non-volatile recording medium to which a limited amount of data can be written. For example, the sub-storing device 254 can be an SSD (Solid State Drive) that is a storing device using a non-volatile memory, an ODD (Optical Disc Drive) that is a storing device using an optical disc, an archive device, or the like.

The program and information stored in the main storing device 252 is the same as those stored in the server device 200. It is noted that the program code and data format may be different.

The computer system 100 may be connected to an unshown external system.

FIGS. 3A, 3B, 3C, and 3D show examples of the connection information 220 according to the first embodiment.

Figure 3B:
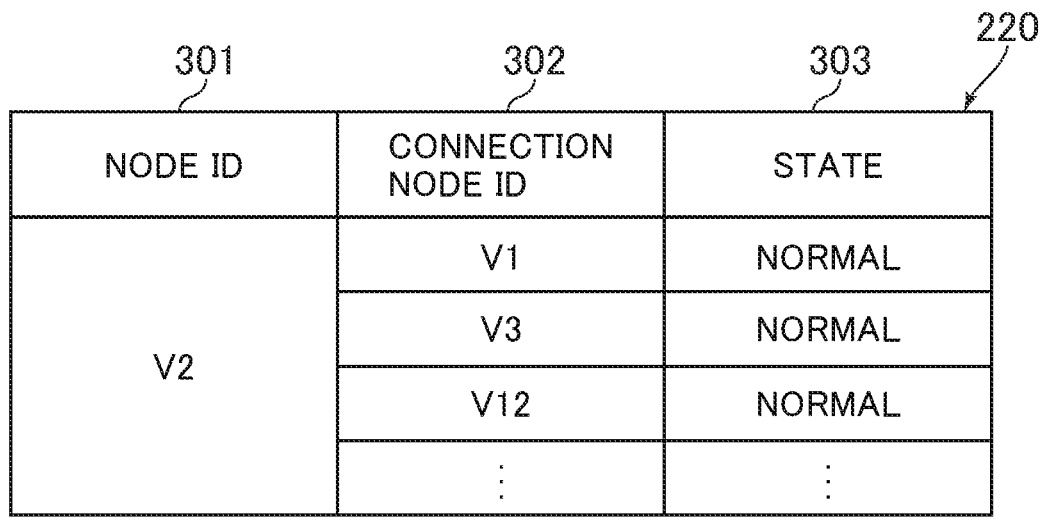
FIG. 3B shows an example of connection information according to the first embodiment.
Figure 3C:
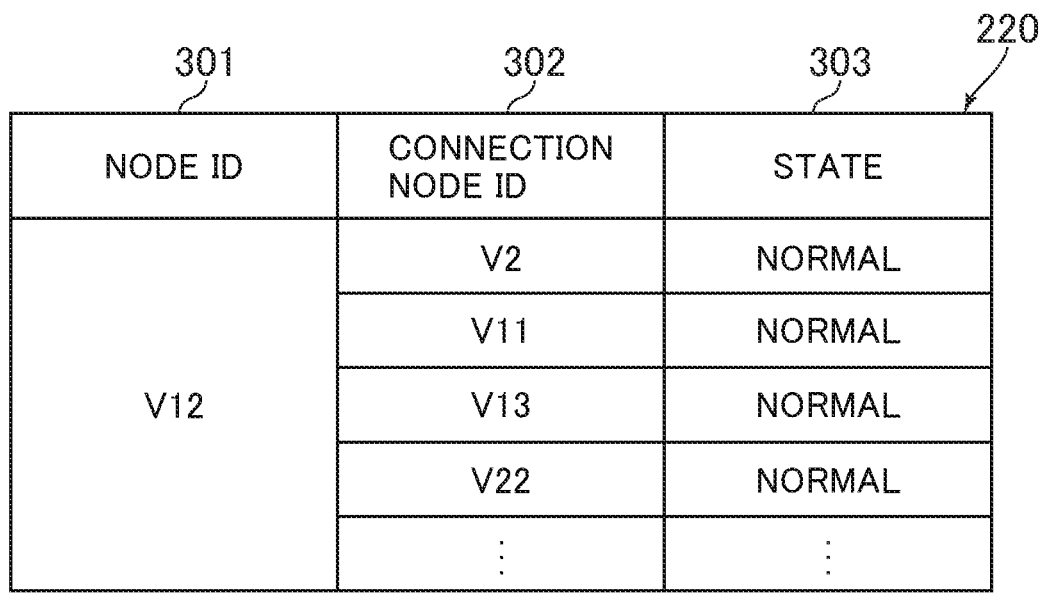
FIG. 3C shows an example of connection information according to the first embodiment.

FIG. 3A shows the connection information 220 stored in the node 101 in which identification information indicates V1. FIG. 3B shows the connection information 220 stored in the node 101 in which the identification information indicates V2. FIG. 3C shows the connection information 220 stored in the node 101 in which the identification information indicates V3. In FIGS. 3A, 3B, and 3C, each node 101 manages the connection relation with the node 101 having the hop count of 1 using the connection information 220.

FIG. 3D shows the connection information 220 stored in the node in which the identification information indicates V1. In FIG. 3D, the node 101 manages the connection relation with the node 101 having the hop count of 2 using the connection information 220.

Although not shown in the figures, other nodes 101 also hold the similar connection information 220. Each node 101 can search for the node 101 included in the evaluation area 110 by referencing the connection information 220.

The connection information 220 includes a plurality of entries constituted by a node ID 301, a connection node ID 302, and a state 303.

The node ID 301 is the identification information of the node 101. The connection node ID 302 is the identification information of the node 101 of which connection relation is managed by the node 101 corresponding to the node ID 301. The connection node ID 302 includes as many rows as the nodes 101 managed by the node 101 corresponding to the node ID 301.

The state 303 indicates an operating state of the node 101 corresponding to the connection node ID 302. The state 303 stores therein either "normal" indicating that the node 101 operates correctly or "abnormal" indicating that the node 101 is not operating correctly.

In this embodiment, the control unit 210 periodically monitors the operating state of the node 101 corresponding to the connection node ID 302 using a heart-beat signal or the like, or monitors response time to a request transmitted from the node 101 corresponding to the node ID 301 to the node 101 corresponding to the connection node ID 302. The control unit 210 updates a value of the state 303 based on the monitoring result.

It should be noted that, when the connection relation between the nodes 101 changes, the connection information 220 is also updated. For example, when the node 101 is added to be connected to a certain node 101, the added node 101 transmits a request for registering the identification information of its own node 101 to an adjacent node 101. The adjacent node 101 adds an entry corresponding to the newly added node 101 to the connection information 220. The adjacent node 101 transmits the updated connection information 220 to other nodes 101 as needed.

For example, when the node 101 is deleted, the node 101 to be deleted transmits a request for deleting the identification information of its own node 101 to the adjacent node 101. The adjacent node 101 deletes the entry corresponding to the node 101 to be deleted from the connection information 220. The adjacent node 101 transmits the updated connection information 220 to other nodes 101. This allows for updating the connection information 220 stored in all the nodes 101 included in the computer system 100.

FIG. 4 shows an example of the index information 221 according to the first embodiment.

The index information 221 includes a plurality of entries constituted by a control ID 401, a control value type 402, obtained index 403, and timing 404.

The control ID 401 is the identification information of an entry to the index information 221. The control value type 402 is the type of the control value to be calculated. The obtained index 403 is the type of the index obtained to calculate the evaluation value. The timing 404 is an execution trigger for the control content determination processing corresponding to the entry.

The control value type 402 in the first entry in FIG. 4 indicates that the number of requests processed to improve the processing performance (to distribute the load) is calculated as the control value. The control value type 402 in the second entry in FIG. 4 indicates that the number of requests processed to improve the processing performance per power consumption is calculated as the control value. The control value type 402 in the third entry in FIG. 4 indicates that an amount of write data to equalize the amount of data written to the sub-storing device 254 is calculated as the control value. The control value type 402 in the fourth entry in FIG. 4 indicates that the number of requests transferred to another node 101 to reduce the processing load is calculated as the control value.

FIG. 5 shows an example of the definitional equation information 222 according to the first embodiment.

The definitional equation information 222 includes a plurality of entries constituted by a control ID 501, a value type 502, a definitional equation 503, and a calculated value 504.

The control ID 501 is identical to the control ID 401. The value type 502 is the type of the value to be calculated. The definitional equation 503 is a definitional equation to calculate the value corresponding to the value type 502. The calculated value 504 is a value calculated using the definitional equation set for the definitional equation 503. When the value is not calculated, the calculated value 504 is blank. The calculated value 504 may also store therein time at which the value is calculated.

In this embodiment, five values including a self-evaluation value, a transmission adjacent point, a reception adjacent point, a self-point, and a control value, and a definitional equation to calculate the five values are set for one control ID. It should be noted that the number of the definitional equations to calculate a single control value is not limited.

FIG. 6 is a flowchart illustrating a control content determination processing performed by the control unit 210 according to the first embodiment.

The control unit 210 performs, when detecting an execution trigger stored in the timing 404, the control content determination processing described below. At the same time, the control unit 210 temporarily stores the control ID 401 of the entry corresponding to the detected execution trigger in the storing unit 211 as a reference ID.

The control unit 210 identifies the adjacent node 101 with reference to the connection information 220 (Step S601). The control unit 210 then calculates the evaluation value of its own node 101 (Step S602). Specifically, the following processing is performed.

The control unit 210 identifies the index to be obtained with reference to the obtained index 403 of the entry of which control ID 401 matches the reference ID. The control unit 210 obtains the identified index from its own node 101.

The control unit 210 searches for an entry of which control ID 501 matches the reference ID and also of which value type 502 is the self-evaluation value. The control unit 210 obtains the definitional equation to calculate the evaluation value (self-evaluation value) of its own node 101 from the definitional equation 503 of the searched entry.

The control unit 210 calculates the evaluation value of its own node 101 based on the value of the index and the definitional equation of the self-evaluation value. The control unit 210 stores the calculated self-evaluation value in the calculated value 504 of the searched entry. The description of the processing at Step S602 is as described above.

Next, the control unit 210 obtains the evaluation value from the adjacent node 101 (Step S603). Specifically, the following processing is performed.

The control unit 210 determines whether the adjacent node 101 is correctly operating with reference to the state 303 of each entry in the connection information 220. The control unit 210 excludes the adjacent node 101 that is not operating correctly from candidates for obtaining the evaluation value.

The control unit 210 instructs the transceiver device 203, 253 to transmit a request for obtaining the evaluation value to the adjacent node 101 that is the candidate for obtaining the evaluation value. The transceiver device 203, 253 transmits the request for obtaining the evaluation value to the adjacent node 101 according to the instruction. It should be noted that the obtaining request includes the reference ID.

When receiving the request for obtaining the evaluation value, the control unit 210 in the adjacent node 101 searches for an entry of which control ID 501 matches the reference ID included in the obtaining request and also of which value type 502 is the self-evaluation value. The control unit 210 in the adjacent node 101 determines whether any value is stored in the calculated value 504 of the searched entry.

When a value is stored in the calculated value 504 of the searched entry, the control unit 210 in the adjacent node 101 obtains the value. When no value is stored in the calculated value 504 of the searched entry, the control unit 210 in the adjacent node 101 calculates the self-evaluation value by performing the same processing as Step S602.

It should be noted that, when a value is stored in the calculated value 504 of the searched entry, the control unit 210 in the adjacent node 101 may determine whether there is a need of calculating the self-evaluation value again. For example, if a certain period has passed since the self-evaluation value was calculated, the control unit 210 in the adjacent node 101 determines that there is a need of calculating the self-evaluation value.

The control unit 210 in the adjacent node 101 transmits a response including the self-evaluation value to the node 101 that originally transmitted the obtaining request.

The control unit 210 that transmitted the obtaining request temporarily stores in the storing unit 211 the evaluation value included in the response received from the adjacent node 101 as an adjacent evaluation value. It should be noted that the adjacent evaluation value is associated with the identification information of the adjacent node 101. The description of the processing at Step S603 is as described above.

Next, the control unit 210 calculates the transmission adjacent point based on the evaluation value, and transmits the transmission adjacent point to the adjacent node 101 (Step S604). Specifically, the following processing is performed.

The control unit 210 searches for an entry of which control ID 501 matches the reference ID and of which value type 603 is the transmission adjacent point. The definitional equation to calculate the transmission adjacent point includes the self-evaluation value calculated at Step S602 and a comparison operation using the adjacent evaluation value obtained at Step S603. The control unit 210 obtains the definitional equation to calculate the transmission adjacent point from the definitional equation 503 of the searched entry. The control unit 210 calculates the transmission adjacent point based on the definitional equation of the transmission adjacent point using the self-evaluation value and the adjacent evaluation value. The control unit 210 stores the calculated transmission adjacent point in the calculation value 504 of the searched entry.

The control unit 210 instructs the transceiver device 203, 253 to transmit the calculated transmission adjacent point. The transceiver device 203, 253 transmits the transmission adjacent point to the adjacent node 101 according to the instruction.

The control unit 210 obtains the transmission adjacent point from each adjacent node 101, and calculates the reception adjacent point (Step S605). Specifically, the following processing is performed.

The control unit 210 determines whether the adjacent node 101 is correctly operating with reference to the state 303 of each entry in the connection information 220. The control unit 210 excludes the adjacent node 101 that is not operating correctly from candidates for obtaining the transmission adjacent point. The determination processing may also be performed using the determination result at Step S603.

The control unit 210 sets the adjacent point of the adjacent node 101 that is not correctly operating to "0", and temporarily stores in the storing unit 211 the adjacent point associated with the identification information of the adjacent node 101.

The control unit 210 instructs the transceiver device 203, 253 to transmit a request for obtaining the transmission adjacent point to the adjacent node 101 that is the candidate for obtaining the transmission adjacent point. The transceiver device 203, 253 transmits the request for obtaining the transmission adjacent point to the adjacent node 101 according to the instruction. It should be noted that the obtaining request includes the reference ID.

When receiving the request for obtaining the transmission adjacent point, the control unit 210 in the adjacent node 101 searches for an entry of which control ID 501 matches the reference ID included in the obtaining request and also of which value type 502 is the transmission adjacent point. The control unit 210 in the adjacent node 101 determines whether any value is stored in the calculated value 504 of the searched entry.

When a value is stored in the calculated value 504 of the searched entry, the control unit 210 in the adjacent node 101 obtains the value. When no value is stored in the calculated value 504 of the searched entry, the control unit 210 in the adjacent node 101 calculates the transmission adjacent point by performing the same processing as Step S604.

It should be noted that, when a value is stored in the calculated value 504 of the searched entry, the control unit 210 in the adjacent node 101 may determine whether there is a need of calculating the transmission adjacent point again. For example, if a certain period has passed since the transmission adjacent point was calculated, the control unit 210 in the adjacent node 101 determines that there is a need of calculating the transmission adjacent point.

The control unit 210 in the adjacent node 101 transmits a response including the transmission adjacent point to the node 101 that originally transmitted the obtaining request.

It is noted that the control unit 210 in the adjacent node 101 may calculate the transmission adjacent point taking receipt of the request for obtaining the evaluation value as a trigger.

The control unit 210 that transmitted the obtaining request temporarily stores the transmission adjacent point included in the response received from the adjacent node 101 in the storing unit 211. It should be noted that the transmission adjacent point is associated with the identification information of the adjacent node 101.

When obtaining the transmission adjacent point from all the adjacent nodes 101, the control unit 210 searches for an entry of which control ID 501 matches the reference ID and also of which value type 502 is the reception adjacent point. The control unit 210 obtains the definitional equation to calculate the reception adjacent point from the definitional equation 503 in the searched entry. The control unit 210 calculates the reception adjacent point based on the definitional equation of the transmission adjacent point and the reception adjacent point of the adjacent node 101. The control unit 210 stores the calculated reception adjacent point in the calculated value 504 of the searched entry. The description of the processing at Step S605 is as described above.

Next, the control unit 210 calculates the self-point (Step S606).

Specifically, the control unit 210 searches for an entry of which control ID 501 matches the reference ID and also of which value type 502 is the self-point, with reference to the definitional equation information 222. The control unit 210 obtains the definitional equation to calculate the self-point from the definitional equation 503 in the searched entry. The control unit 210 calculates the self-point based on the definitional equation of the self-point, and stores the calculated self-point in the calculated value 504 of the searched entry.

The control unit 210 then calculates the control value based on the self-point and the reception adjacent point (Step S607).

Specifically, the control unit 210 searches for an entry of which the control ID 501 matches the reference ID and also of which value type 502 is the control value, with reference to the definitional equation information 222. The control unit 210 obtains the definition equation to calculate the control value from the definitional equation 503 in the searched entry. The control unit 210 calculates the control value based on the definitional equation of the control value using the self-point and the reception adjacent point, and stores the calculated control value in the calculated value 504 in the searched entry. The control unit 210 controls the processing performed by the node 101 based on the control value.

It should be noted that the processing steps shown in FIG. 6 may be performed in any sequential order as long as consistency is ensured. For example, the control unit 210 may calculate the transmission adjacent point after calculating the self-point. The processing order may be altered according to the definitional equation.

As described above, each node 101 included in the computer system 100 obtains the point indicative of the relative performance of the node 101 from its own node 101 and the adjacent node 101, and determines the control value to control the process performed by the node 101 based on the point. The node 101 has a low communication load and a low arithmetic processing load because it obtains necessary data only from the adjacent node 101. Moreover, since all the nodes 101 can autonomously determine the control value, it is possible to improve the processing performance of a large-scale computer system.

Second Embodiment

In a second embodiment, an application example of the present invention is described taking an example of control to improve the processing performance of the computer system 100 including a plurality of server devices 200. In the second embodiment, the number of requests that the node 101 can process is calculated as the control value. Now, the definitional equation used in the second embodiment is described. It should be noted that the definitional equations shown below are merely examples and the invention is not limited thereto.

The self-evaluation value is calculated using Equation 1. $Y_i$ represents the self-evaluation value of the node 101 of which identification information is "i". The self-evaluation value in this embodiment is a value indicative of standardized processing ability. Brate represents processing availability of the node 101 of which the identification information is "i", which is given by Equation 2. $Ymax_i$ represents a standardized maximum processing capability of the node 101 of which identification information is "i", which is given by Equation 3.

[Equation 1]
$$Y_i = (1 - Brate) \times Ymax_i \qquad (1)$$

[Equation 2]
$$Brate = \frac{(\text{Number of Effective } CUP \text{ Cores})_i \times (\text{Effective Operating Frequency})_i}{(\text{Maximum Number of } CPU \text{ Cores})_i \times (\text{Maximum Operating Frequency})_i} \qquad (2)$$

[Equation 3]
$$Ymax_i = \frac{(\text{Maximum Number of } CPU \text{ Cores})_i \times (\text{Maximum Operating Frequency})_i}{(\text{Standard Number of } CPU \text{ Cores}) \times (\text{Standard Operating Frequency})} \qquad (3)$$

(Number of Effective CUP Cores)$_i$ represents the number of the CPU cores actually used by the node 101 of which the identification information is "i", and (Effective Operating Frequency)$_i$ represents an effective operating frequency of the CPU core used by the node 101 of which the identification information is "i". (Maximum Number of CPU Cores)$_i$ represents a total value of the CPU cores included in the CPU 201 included in the node 101 of which the identification information is "i", and (Maximum Operating Frequency)$_i$ represents the maximum operating frequency of the CPU 201 included in the node 101 of which the identification information is "i". Standard Number of CPU Cores and Standard Operating Frequency are the number of the CPU cores and the operating frequency used as the basis for standardizing each value, respectively.

The transmission adjacent point is calculated using Equation 4. $PN_{ji}$ represents the transmission adjacent point to be transmitted from its own node 101 of which identification information is "i" to the adjacent node 101 of which identification information is "j". $YN_j$ represents the adjacent evaluation value of the node 101 of which the identification information it "j". $P_1$ and $P_2$ represent the points. $P_1$ and $P_2$ are given by an arbitrary constant $P_0$ larger than 0 as indicated by Equation 5. $Avg\_Y_i$ represents an average value of the evaluation values calculated by the node 101 of which the identification information is "i". $Avg\_Y_i$ is calculated from the self-evaluation value $Y_i$ and the adjacent evaluation value $TN_j$.

[Equation 4]

$$PN_{ji} = \begin{cases} +P_1 & \text{if } YN_j > Avg\_Y_i \\ -P_2 & \text{if } YN_j < Avg\_Y_i \\ 0 & \text{if } YN_j = Avg\_Y_i \end{cases} \quad (4)$$

[Equation 5]

$$P_1 = P_2 = P_0 \quad (5)$$

As indicated by Equation 4, when the adjacent evaluation value $YN_j$ is larger than the average value $Avg\_Y_i$ of the evaluation values, a positive point "$+P_1$" is transmitted to the adjacent node 101. When the adjacent evaluation value $YN_j$ is smaller than the average value $Avg\_Y_i$ of the evaluation values, a negative point "$-P_2$" is transmitted to the adjacent node 101. When the adjacent evaluation value $YN_j$ is equal to the average value $Avg\_Y_i$ of the evaluation values, a point "0" is transmitted to the adjacent node 101.

The self-point is calculated using Equation 6. $PO_i$ represents the self-point of the node 101 of which the identification information is "i". PM0 is an arbitrary constant.

[Equation 6]

$$PO_i = PM_0 \times Y_i \quad (6)$$

The number of requests to be processed is calculated using Equation 7. $X_i$ represents the number of requests to be processed set to the node 101 of which the identification information is "i". $Xmax_i$ represents the maximum number of the requests that can be processed by the node 101 of which the identification information is "i", which is given by Equation 8. $X_0$ is an arbitrary constant. $Total\_P_i$ represents a summed point calculated by the node 101 of which the identification information is "i", which is given by Equation 9. $PG_i$ represents the reception adjacent point calculated by the node 101 of which the identification information is "i", which is given by Equation 10. It should be noted that $PN_{ij}$ represents the transmission adjacent point transmitted from the adjacent node 101 of which identification information is "j" to its own node 101 of which identification information is "i".

[Equation 7]

$$X_i = Xmax_i \times \frac{(Total\_P_i)}{(PSmax)} \quad (7)$$

[Equation 8]

$$Ymax_i = X_0 \times Ymax_i \quad (8)$$

[Equation 9]

$$Total\_P_i = PO_i + PG_i \quad (9)$$

[Equation 10]

$$PG_i = \sum_j PN_{ij} \quad (10)$$

PSmax represents the maximum value of the total value of the points, and it is calculated using Equation 11. Number of Adjacent Nodes in Equation 11 represents the number of the adjacent nodes 101 identified at Step S601.

[Equation 11]

$$PSmax = (PM_0 \times Ymax_i) + (P_0 \times (\text{Number of Adjacent Nodes})) \quad (11)$$

The summed point indicates the relative processing performance of the CPU 201 in the server device 200 included in the computer system 100. Thus, a larger summed point means a higher processing performance of the server device 200.

The control unit 210 sets the number of requests to be processed calculated based on Equation 7 to the transceiver device 203. The transceiver device 203 controls the number of the requests to be processed based on the value.

It should be noted that the maximum value of the total value of the adjacent point, the self-point, and the point may be calculated using Equations 12, 13, and 14.

[Equation 12]

$$PN_{ji} = \begin{cases} +P_1 & \text{if } YN_j > Y_i \\ -P_2 & \text{if } YN_j < Y_i \\ 0 & \text{if } YN_j = Y_i \end{cases} \quad (12)$$

[Equation 13]

$$PO_i = PM_0 \times \frac{Y_i}{Avg\_Y_i} \quad (13)$$

[Equation 14]

$$PSmax = \left(PM_0 \times \frac{Ymax_i}{Avg\_Y_i}\right) + (P_0 \times (\text{Number of Adjacent Nodes})) \quad (14)$$

The self-point may be calculated using Equation 15. $PM_1$ is given by Equation 16, and $PM_2$ is given by Equation 17. $PM_3$ is an arbitrary constant larger than 0.

[Equation 15]

$$PO_i = \begin{cases} +PM_1 & \text{if } Y_i > Avg\_Y_i \\ -PM_2 & \text{if } Y_i < Avg\_Y_i \\ +PM_1 & \text{if } Y_i = Avg\_Y_i \end{cases} \quad (15)$$

[Equation 16]

$$PM_1 = PM_3 \times \frac{Y_i}{\mathrm{Avg\_}Y_i} \quad (16)$$

[Equation 17]

$$PM_2 = PM_3 \times \frac{\mathrm{Avg\_}Y_i}{Y_i} \quad (17)$$

The number of the requests to be processed set to the node 101 of which the identification information is "i" may be calculated using Equation 18. $X_i(N)$ represents the number of requests to be processed previously calculated by the node 101 of which the identification information is "i". $X_1$ is an arbitrary constant.

[Equation 18]

$$X_i(N) = X_i(N-1) + X_1 \times \mathrm{Total\_}P_i \quad (18)$$

It should be noted that, when calculating the average of the evaluation values, the adjacent evaluation value of the adjacent node 101 of which adjacent point is "0" may be excluded. This is to avoid any influence on the adjacent node 101 of which adjacent point is "0".

(Variation)

If the number of requests received by a certain node 101 is larger than the control value calculated based on Equation 7, the control unit 210 obtains a free resource amount of its own node 101 and a free resource amount of an adjacent node 101 as the evaluation values, and calculates the point from the free resource amounts of the nodes 101. The control unit 210 calculates the node 101 to which the request is transferred and the number of requests to be transferred as the control values based on the point. For example, the control unit 210 identifies an adjacent node 101 having a point higher than a predetermined threshold, and calculates the number of requests to be transferred based on a point ratio of the identified adjacent node 101.

It should be noted that the free resource amount of the adjacent node 101 of which identification information is "j" is given by, for example, Equation 19. $R_j$ represents the free resource amount of the adjacent node 101 of which identification information is "j". $X_j$ represents the control value set to the adjacent node 101 of which identification information is "j". (Number of Received Requests)$_j$ represents the number of requests already received by the adjacent node 101 of which identification information is "j".

[Equation 19]

$$R_j = X_j - (\text{Number of Received Requests})_j \quad (19)$$

It should be noted that the constants included in equations can be altered as needed according to the purpose, the system configuration, and the like.

According to the second embodiment, each node 101 can figure out the relative processing performance in the system based on the point of its own node 101 and the point obtained from the adjacent node 101 and set the control value to improve the processing performance of the system.

Third Embodiment

In a third embodiment, an application example of the present invention is described taking an example of control to improve the processing performance of the computer system 100 including a plurality of server devices 200 in consideration of power efficiency. In the third embodiment, the number of requests that the node 101 can process is calculated as the control value. Now, the definitional equation used in the third embodiment is described. It should be noted that the definitional equations shown below are merely examples and the invention is not limited thereto.

The self-evaluation value is calculated using Equation 20. $Z_i$ represents the self-evaluation value of the node 101 of which the identification information is "i". The self-evaluation value in this embodiment is a value indicative of processing capability per standardized unit power consumption. $CPE_i$ represents effective power efficiency of the CPU 201 in the node 101 of which the identification information is "i", which is given by Equation 21. SPE represents standard power efficiency of the standard CPU, which is given by Equation 22. SPE is the power efficiency of the CPU used as the basis for standardizing each value. (Actual CPU Power Consumption)$_i$ represents the power consumption of the CPU actually used by the node 101 of which the identification information is "i". (Maximum CPU power consumption)$_i$ represents the power consumption of the CPU when the CPU 201 included in the node 101 of which the identification information is "i" operates all the CPU cores at the maximum operating frequency.

[Equation 20]

$$Z_i = \frac{CPE_i}{SPE} \quad (20)$$

[Equation 21]

$$CPE_i = \frac{(\text{Number of Effective CUP Cores})_i \times (\text{Effective Frequency})_i}{(\text{Actual } CPU \text{ Power Consumption})_i} \quad (21)$$

[Equation 22]

$$SPE = \frac{(\text{Standard Number of } CPU \text{ Cores}) \times (\text{Standard Frequency})}{(\text{Standard } CPU \text{ Power Consumption})} \quad (22)$$

In the third embodiment, the transmission adjacent point is calculated based on the standardized maximum processing capability per unit power consumption. This value is calculated using Equation 23. $Zmax_i$ represents the standardized maximum processing capability per unit power consumption of the node 101 of which the identification information is "i". $CPM_i$ represents the maximum value of the power efficiency of the CPU 201 in the node 101 of which the identification information is "i", which is given by Equation 24.

[Equation 23]

$$Zmax_i = \frac{CPM_i}{SPE} \quad (23)$$

[Equation 24]

$$CPM_i = \frac{(\text{Maximum Number of } CPU \text{ Cores})_i \times (\text{Maximum Frequency})_i}{(\text{Maximum } CPU \text{ Power Consumption})_i} \quad (24)$$

$PN_{ji}$, $PO_i$, $X_i$, and PSmax in the third embodiment described below are regarded the same as $PN_{ji}$, $PO_i$, $X_i$, and PSmax in the second embodiment.

The transmission adjacent point is calculated using Equation 25. $ZN_j$ represents the adjacent evaluation value of the node 101 of which the identification information it "j". $P_1$ and $P_2$ are given by an arbitrary constant $PP_0$ larger than 0 as indicated by Equation 26. $Avg\_Z_i$ represents an average of the evaluation values calculated by the node 101 of which the identification information is "i". $Avg\_Z_i$ is calculated from the self-evaluation value $Z_i$ and the adjacent evaluation value $ZN_j$.

[Equation 25]

$$PN_{ji} = \begin{cases} +P_1 & \text{if } ZN_j > Avg\_Z_i \\ -P_2 & \text{if } ZN_j < Avg\_Z_i \\ 0 & \text{if } ZN_j = Avg\_Z_i \end{cases} \quad (25)$$

[Equation 5]

$$P_1 = P_2 = PP_0 \quad (5)$$

The self-point is calculated using Equation 27. PPM0 is an arbitrary constant. The number of requests to be processed is calculated using Equations 29 to 31. The total value of the points is calculated using Equation 32. Equations 27 to 32 correspond to Equations 6 to 11.

[Equation 27]

$$PO_i = PPM_0 \times Z_i \quad (27)$$

[Equation 28]

$$X_i = Xmax_i \times \frac{(Total\_P_i)}{(PSmax)} \quad (28)$$

[Equation 29]

$$Xmax_i = XP_0 \times Zmax_i \quad (29)$$

[Equation 30]

$$Total\_Pi = PO_i + PG_j \quad (30)$$

[Equation 31]

$$PG_i = \sum_j PN_{ij} \quad (31)$$

[Equation 32]

$$PSmax = (PPM_0 \times Zmax_i) + (PP_0 \times (\text{Number of Adjacent Nodes})) \quad (32)$$

As indicated by Equation 30, the summed point indicates the relative processing performance per unit power consumption of the CPU 201 in the server device 200 included in the computer system 100. Thus, a larger summed point means a higher processing performance of the server device 200 per unit power consumption.

The control unit 210 in the third embodiment sets to the transceiver device 203 the number $X_i$ of requests to be processed calculated based on Equation 28, as with the control unit 210 in the second embodiment. The transceiver device 203 controls the number of the requests to be processed based on the value.

It should be noted that he constants included in equations can be altered as needed according to the purpose, the system configuration, and the like.

According to the third embodiment, each node 101 can figure out the relative processing performance per unit power consumption in the system based on the point of its own node 101 and the point obtained from the adjacent node 101 and set the control value to improve the processing performance per unit power consumption.

Fourth Embodiment

In a fourth embodiment, an application example of the present invention is described taking an example of equalization of amounts of write data in the computer system 100 including a plurality of storage devices 250. In the fourth embodiment, an amount of data that can be written to the sub-storing device 254 in the node 101 (writable data amount) is calculated as the control value. Now, the definitional equation used in the fourth embodiment is described. It should be noted that the definitional equations shown below are merely examples and the invention is not limited thereto.

In the fourth embodiment, the effective maximum amount of write data in each storage device 250 is calculated as the evaluation value.

The self-evaluation value is calculated using Equation 33. $LE_i$ represents the self-evaluation value of the node 101 of which the identification information is "i". The self-evaluation value in this embodiment is a value indicative of the standardized effective maximum amount of write data, and indicates the longevity of the storage device 250. $Lmax_i$ represents the standardized maximum amount of write data of the node 101 of which the identification information is "i", which is given by Equation 34. (Maximum Amount of Write Data)$_i$ represents the maximum amount of the data that can be written to the sub-storing device 254 included in the node 101 of which the identification information is "i". Reference Amount of Write Data is the amount of write data used as the reference for standardization. $LA_i$ represents the standardized actual amount of write data of the node 101 of which the identification information is "i", which is given by Equation 35. (Actual Amount of Write Data)$_i$ represents the amount of data written to the sub-storing device 254 included in the node 101 of which the identification information is "i".

[Equation 33]

$$LE_i = Lmax_i - LA_i \quad (33)$$

[Equation 34]

$$Lmax_i = \frac{(\text{Maximum Amount of Write Data})_i}{\text{Reference Amount of Write Data}} \quad (34)$$

[Equation 35]

$$LA_i = \frac{(\text{Actual Amount of Write Data})_i}{\text{Reference Amount of Write Data}} \quad (35)$$

The transmission adjacent point is calculated using Equation 36. $LEN_j$ represents the adjacent evaluation value of the node 101 of which the identification information it "j". $P_1$ and $P_2$ are given by an arbitrary constant $PL_0$ larger than 0 as indicated by Equation 37. $Avg\_LE_i$ represents an average of the evaluation values calculated by the node 101 of which the identification information is "i". $Avg\_LE_i$ is calculated from the self-evaluation value $LE_i$ and the adjacent evaluation value $LE_j$.

[Equation 36]

$$PN_{ji} = \begin{cases} +P_1 & \text{if } LEN_j > Avg\_LE_i \\ -P_2 & \text{if } LEN_j < Avg\_LE_i \\ 0 & \text{if } LEN_j = Avg\_LE_i \end{cases} \quad (36)$$

[Equation 37]

$$P_1 = P_2 = PL_0 \quad (37)$$

The self-point is calculated using Equation 38. $PLM_0$ is an arbitrary constant. The writable data amount is calculated using Equations 39 to 42. The total value of the points is calculated using Equation 43. Equations 38 to 43 correspond to Equations 6 to 11. $WE_i$ represents the writable data amount of the node 101 of which the identification information is "i". $LBmax_i$ represents the block size of the node 101 of which the identification information is "i". It should be noted that the block size may be a physical block size of the sub-storing device 254 or a block size compiling a plurality of physical block sizes. $PBmax_i$ represents the physical block size of the node 101 of which the identification information is "i". The block size may be the physical block size of the sub-storing device 254 or a block size compiling a plurality of physical block sizes. $LNP_0$ is an arbitrary constant.

[Equation 38]

$$PO_i = PLM_0 \times LE_i \quad (38)$$

[Equation 39]

$$WE_i = LBmax_i \times \frac{(Total\_P_i)}{(PSmax)} \quad (39)$$

[Equation 40]

$$LBmax_i = LNP_0 \times PBmax_i \quad (40)$$

[Equation 41]

$$Total\_P_i = PO_i + PG_i \quad (41)$$

[Equation 42]

$$PG_i = \sum_j PN_{ij} \quad (42)$$

[Equation 43]

$$PSmax = (PLM0 \times Lmaxi) + (PL0 \times (\text{Number of Adjacent Nodes})) \quad (43)$$

The control unit 210 sets the writable data amount $WE_i$ calculated based on Equation 39 to the transceiver device 253. The transceiver device 253 controls the amount of write data based on the value.

It should be noted that the transmission adjacent point can also be calculated using Equation 12 with $Y_i$ and $YN_j$ replaced by $LE_i$ and $LEN_j$.

In this case, $PM_0$, $Y_i$, and $Avg\_Y_i$ in Equation 13 are replaced by $PLM_0$, $LE_i$, and $Avg\_LE_i$. Furthermore, $PM_0$, $Ymax_i$, $Avg\_Y_i$, and $P_0$ in Equation 14 are replaced by $PLM_0$, $Lmax_i$, $Avg\_LE_i$, and $PL_0$.

It is also to calculate the self-point using Equation 15 with $Y_i$ and $Avg\_Y_i$ replaced by $LE_i$ and $Avg\_LE_i$.

In this case, $PM_3$, $Y_i$, and $Avg\_Y_i$ in Equations 16 and 17 are replaced by $PLM_3$, $LE_i$, and $Avg\_LE_i$. $PLM_3$ is an arbitrary constant.

It is also possible to calculate the writable data amount using Equation 18 with $X_i$ and $X_1$ replaced by $WE_i$ and WE'. $WE_i(N)$ represents the writable data amount calculated by the node 101 of which the identification information is "i" at the current time, and $WE_i(N-1)$ represents the writable data amount calculated by the node 101 of which the identification information is "i" last time. $WE_1$ is an arbitrary constant. $Total\_P_i$ is given by Equation 41.

It should be noted that he constants included in equations can be altered as needed according to the purpose, the system configuration, and the like.

According to the fourth embodiment, each node 101 figures out the relative effective maximum amount of write data, or the longevity, of each storage device 250 in the computer system 100 based on the point of its own node 101 and the point obtained from the adjacent node 101. Each storage device 250 can equalize the amounts of write data among the storage devices 250 in the computer system 100 by controlling the amount of write data (control value) according to the longevity. This can extend the longevity of the system.

Fifth Embodiment

A fifth embodiment is different from the first embodiment in that the control unit 210 selects the node 101 other than the adjacent node 101 at random and transmits and receives the point to and from the selected node 101. The fifth embodiment is described below focusing on the difference from the first embodiment.

The configuration of the computer system 100 in the fifth embodiment is the same as that in the first embodiment. The hardware configuration and the software configuration of the node 101 in the fifth embodiment are also the same as those in the first embodiment. It should be noted that the definitional equation information 222 in the fifth embodiment is newly added with entries of the correction transmission adjacent point and the correction self-point.

FIG. 7 is a flowchart illustrating a control content determination processing performed by the control unit 210 according to the fifth embodiment.

When detecting the execution trigger stored in the timing 404 of a predetermined entry, the control unit 210 performs the control content determination processing described below. At the same time, the control unit 210 temporarily stores the control ID 401 of the entry corresponding to the detected execution trigger in the storing unit 211 as the reference ID.

After performing the processing at Step S601, the control unit 210 selects the node 101 (Step S701).

Specifically, the control unit 210 selects one or more nodes 101 from among the nodes 101 except the adjacent node 101 with reference to the connection information 220. For example, the control unit 210 may select the node 101 by generating a random number. It should be noted that the number of the nodes to be selected is determined in advance.

In the following description, the node 101 selected at Step S701 is referred to as the random node 101.

The processing from Step S602 to Step S604 is the same as those in the first embodiment. The control unit 210 obtains the average of the evaluation values from the random node 101 (Step S702). It is noted that the control unit 210 may obtain the evaluation value from the random node 101.

Next, the control unit 210 calculates the correction transmission adjacent point using the average of the evaluation values obtained from the random node 101, the self-evaluation value, the adjacent evaluation value, and the definitional equation, and transmits the correction transmission adjacent point to the adjacent node 101 (Step S703).

In the case of the fifth embodiment, the correction transmission adjacent point is calculated using, for example, Equation 44. $PRN_{ji}$ represents the correction transmission adjacent point transmitted from its own node 101 of which identification information is "i" to the random node 101 of which identification information is "j". $YN_j$ represents the adjacent evaluation value of the node 101 of which the identification information it "j". $PR_1$ and $PR_2$ represent the points. $PR_1$ and $PR_2$ are given by an arbitrary constant $PR_0$ larger than 0 as indicated by Equation 45. $Avg\_YR_k$ represents an average value of the evaluation values obtained from the random node 101 of which identification information is "k".

[Equation 44]

$$PRN_{ji} = \begin{cases} +PR_1 & \text{if } YN_j > Avg\_YR_k \\ -PR_2 & \text{if } YN_j < Avg\_YR_k \\ 0 & \text{if } YN_j = Avg\_YR_k \end{cases} \quad (44)$$

[Equation 45]

$$PR_1 = PR_2 = PR_0 \quad (45)$$

As indicated by Equation 44, when the adjacent evaluation value $YN_j$ is larger than the average value $Avg\_YR_k$ of the evaluation values, a positive point "+$PR_1$" is transmitted to the adjacent node 101. When the adjacent evaluation value $YN_j$ is smaller than the average value $Avg\_YR_k$ of the evaluation values, a negative point "–$PR_2$" is transmitted to the adjacent node 101. When the adjacent evaluation value $YN_j$ is equal to the average value $Avg\_YR_k$ of the evaluation values, a point "0" is transmitted to the adjacent node 101.

It should be noted that the calculated correction transmission adjacent point is stored in the calculated value 504 of the predetermined entry of the definitional equation information 222, as in the processing at Step S604.

Next, the control unit 210 obtains the transmission adjacent point and the correction transmission adjacent point from the adjacent node 101, and calculates the reception adjacent point (Step S704).

The way to obtain the point from the adjacent node 101 is the same as Step S605, and the description thereof is omitted. The control unit 210 calculates the correction reception adjacent point, for example, using Equation 46.

[Equation 46]

$$PG_i = \sum_j PN_{ij} + \sum_j PRN_{ij} \quad (46)$$

Next, the control unit 210 performs the processing at Step S606. The processing at Step S606 is the same as that in the first embodiment. The control unit 210 then calculates the correction self-point using the self-evaluation value, the evaluation value obtained from the adjacent node 101, the average of the evaluation values obtained from the random node 101, and the definitional equation (Step S705).

In the case of the fifth embodiment, the correction self-point is calculated, for example, based on Equation 47 as shown below. $POR_1$ represents the correction self-point of the node 101 of which the identification information is "i". $PMR_1$ and $PMR_2$ represent the points. $PMR_1$ is given by Equation 48, and $PMR_2$ is given by Equation 49. $PMR_0$ is an arbitrary constant.

[Equation 47]

$$POR_i = \begin{cases} +PMR_1 & \text{if } Y_i > Avg\_YR_k \\ -PMR_2 & \text{if } Y_i < Avg\_YR_k \\ 0 & \text{if } Y_i = Avg\_YR_k \end{cases} \quad (47)$$

[Equation 48]

$$PMR_1 = PMR_0 \times \frac{Avg\_Y_i}{Avg\_YR_k} \quad (48)$$

[Equation 49]

$$PMR_2 = PMR_0 \times \frac{Avg\_YR_k}{Avg\_Y_i} \quad (49)$$

As indicated by Equation 47, when the self-evaluation value $Y_i$ is larger than the average value $Avg\_YR_k$ of the evaluation values, a positive point "+$PMR_1$" is calculated as a self-correction point. When the self-evaluation value $Y_i$ is smaller than the average value $Avg\_YR_k$ of the evaluation values, a negative point "–$PMR_2$" is calculated as the self-correction point. When the self-evaluation value $Y_i$ is equal to the average value $Avg\_YR_k$ of the evaluation values, a point "0" is calculated as the self-correction point. It should be noted that the calculated correction self-point is stored in the calculated value 504 of the predetermined entry of the definitional equation information 222, as in the processing at Step S605.

At Step S607, the control unit 210 calculates the control value based on the self-point PO, the correction self-point POR, and the reception adjacent point PG. For example, the control unit 210 may calculate the control value using Equation 50. $Xmax_i$ is given by Equation 51. $X_0$ is an arbitrary constant. $Total\_P_i$ is given by Equation 52. PSmax is given by Equation 53. Number of Random Nodes represents the number of the random nodes 101 identified at Step 701.

[Equation 50]

$$X_i = Xmax_i \times \frac{(Total\_P_i)}{(PSmax)} \quad (50)$$

[Equation 51]

$$Xmax_i = X_0 \times Ymax_i \quad (51)$$

[Equation 52]

$$Total\_P_i = PO_i + POR_i - PG_i \quad (52)$$

[Equation 53]

$$PSmax = (PM0 \times Ymaxi) + (P0 \times \quad (53)$$
(Number of Adjacent Nodes × Number of Random Nodes))

According to the fifth embodiment, by using supplementary information (correction vale) obtained from a node 101 other than the adjacent node 101, it is possible to calculate a control value better reflecting the overall state of the computer system 100. This makes it possible to control the computer system 100 more accurately.

According to the invention, a single node 101 can be set to achieve the optimum processing without obtaining data from all the nodes 101 included in the computer system 100.

For example, load distribution, optimization of processing performance per power consumption, and equalization of amount of write data can be made possible. Furthermore, the invention can be flexibly applied to change of the system configuration, and makes it possible to adjust various types of control values.

The present invention is not limited to the above embodiments but can include various variations. It is also noted that the above embodiments merely describe detailed configurations to clearly explain the invention but not for the purpose of limiting the invention to include all the configurations described above. A part of a configuration of an embodiment can be added to, deleted, or replaced by another configuration.

Some or all of the above configuration, function, processing unit, processing means, or the like may be achieved on a hardware basis by designing it as an integrated circuit, for example. The invention can also be embodied by using a software program code that achieves the functions of the embodiment. In such a case, a recording medium having the program code recorded therein is provided to a computer, and a CPU included in the computer reads out the program code stored in the recording medium. In this case, the program code itself read from the recording medium achieves the function of the embodiment described above, and thus the program code itself and the recording medium having the program code recorded therein are supposed to constitute the invention. Examples of the recording medium to provide such a program code include, for example, a flexible disk, a CD-ROM, a DVD-ROM, a hard disk, an SSD (Solid State Drive), an optical disk, a magneto-optical disk, a CD-R, a magnetic tape, a non-volatile memory card, a ROM, and the like.

The program code that achieves the function described herein can be written in a wide variety of programing or script languages such as Assembler, C/C++, Pearl, Shell, PHP, and Java (registered trademark).

Furthermore, by distributing the software program code achieving the function of the embodiment via a network, the program code may be stored in a recording means such as a computer hard disk and a memory or a recording medium such as a CD-RW and a CD-R and the CPU included in the computer may read out the program code stored in the recording means or the recording medium for execution.

The above embodiments present control lines and information lines necessary for the description but not necessarily all the control lines and information lines on the product. All the configurations may be connected to one another.

What is claimed is:

1. A computer system including a plurality of computers connected to one another via a network,
wherein each of the plurality of computers includes a processor, a storing device connected to the processor, and a network interface connected to the processor, and
the processor:
detects a trigger to calculate a control value for controlling a process to be performed by the computer;
identifies a target computer for which an evaluation value is obtained to calculate the control value;
calculates the evaluation value of its own computer and stores the evaluation value of the own computer in the storing device;
obtains the evaluation value from the target computer and stores the evaluation value of the target computer in the storing device;
calculates a first point indicative of relative performance of the own computer in the computer system using at least one of the evaluation value of the own computer and the evaluation value of the target computer and stores the first point in the storing device;
calculates a second point indicative of relative performance of the target computer in the computer system based on a comparison processing using the evaluation value of the own computer and the evaluation value of the target computer and transmits the second point to the target computer;
obtains the second point from the target computer and stores the second point obtained from the target computer in the storing device;
calculates the control value using the first point and the second point stored in the storing device and stores the calculated control value in the storing device; and
controls the process performed by the computer based on the control value.

2. The computer system according to claim 1,
wherein the storing device stores therein definitional equation information including an entry associating a type of the control value with a definitional equation to calculate the first point and the second point, and
the processor:
identifies the type of the control value to be calculated;
after obtaining the evaluation value of the own computer, obtains the evaluation value of the target computer by transmitting a request for obtaining the evaluation value including the type of the control value to the target computer; and
identifies a first definitional equation to calculate the first point based on the definitional equation information and calculates the first point based on the first definitional equation.

3. The computer system according to claim 2,
wherein the processor:
when receiving the request to obtain the evaluation value, calculates the evaluation value of the own computer;
transmits the calculated evaluation value to the computer that originally transmitted the request to obtain the evaluation value;
identifies a second definitional equation to calculate the second point based on the type of the control value included in the request to obtain the evaluation value and with reference to the definitional equation information;
calculates the second point based on the evaluation value of the own computer, the evaluation value included in the request to obtain the evaluation value, and the second definitional equation; and
transmits the calculated second point to the computer that originally transmitted the request to obtain the evaluation value.

4. The computer system according to claim 3,
wherein the second definitional equation is an equation to calculate the second point based on a result of comparison between the evaluation value of the target computer and the evaluation value of the own computer.

5. The computer system according to claim 4,
wherein the storing device stores therein connection information for managing a connection relation between the plurality of computers, and the processor selects the computer within a predetermined area on the network as the target computer with reference to the connection information.

6. The computer system according to claim 5,
wherein the processor: selects at least one computer for correction from among the plurality of computers not included in the predetermined area;
obtains a correction value associated with the evaluation value from the computer for correction and stores the correction value obtained from the computer for correction in the storing device;
calculates a third point based on the evaluation value of the target computer and the correction value and transmits the third point to the target computer;
obtains the third point from the target computer and stores the third point obtained from the target computer in the storing device;
calculates a fourth point based on the evaluation value of the own computer and the correction value and stores the fourth point in the storing device; and
calculates the control value based on the first point, the second point, the third point, and the fourth point stored in the storing device.

7. A method of controlling a computer system including a plurality of computers connected to one another via a network,
wherein each of the plurality of computers includes a processor, a storing device connected to the processor, and a network interface connected to the processor, and
the method of controlling the computer system includes:
a first step of detecting, by the processor, a trigger to calculate a control value for controlling a process to be performed by the computer;
a second step of identifying a target computer for which an evaluation value is obtained to calculate the control value;
a third step of calculating the evaluation value of its own computer and storing the evaluation value of the own computer in the storing device;
a fourth step of obtaining the evaluation value from the target computer and storing the evaluation value of the target computer in the storing device;
a fifth step of calculating a first point indicative of relative performance of the own computer in the computer system using at least one of the evaluation value of the own computer and the evaluation value of the target computer and storing the first point in the storing device;
a sixth step of calculating a second point indicative of relative performance of the target computer in the computer system based on a comparison processing using the evaluation value of the own computer and the evaluation value of the target computer and transmitting the second point to the target computer;
a seventh step of obtaining, by the processor, the second point from the target computer and storing the second point obtained from the target computer in the storing device;
an eighth step of calculating, by the processor, the control value using the first point and the second point stored in the storing device and storing the calculated control value in the storing device; and
a ninth step of controlling, by the processor, the process performed by the computer based on the control value.

8. The method of controlling the computer system according to claim 7,
wherein the storing device stores therein definitional equation information including an entry associating a type of the control value with a definitional equation to calculate the first point and the second point,
the third step includes identifying, by the processor, the type of the control value to be calculated,
the fourth step includes obtaining, by the processor, the evaluation value of the target computer by transmitting a request for obtaining the evaluation value including the type of the control value to the target computer, and
the fifth step includes identifying, by the processor, a first definitional equation to calculate the first point based on the definitional equation information and calculating the first point based on the first definitional equation.

9. The method of controlling the computer system according to claim 8, further including:
when receiving the request to obtain the evaluation value, calculating, by the processor, the evaluation value of the own computer;
transmitting, by the processor, the calculated evaluation value to the computer that originally transmitted the request to obtain the evaluation value;
identifying, by the processor, a second definitional equation to calculate the second point based on the type of the control value included in the request to obtain the evaluation value and with reference to the definitional equation information;
calculating, by the processor, the second point based on the evaluation value of the own computer, the evaluation value included in the request to obtain the evaluation value, and the second definitional equation; and
transmitting, by the processor, the calculated second point to the computer that originally transmitted the request to obtain the evaluation value.

10. The method of controlling the computer system according to claim 9,
wherein the second definitional equation is an equation to calculate the second point based on a result of comparison between the evaluation value of the target computer and the evaluation value of the own computer.

11. The method of controlling the computer system according to claim 10,
wherein the storing device stores therein connection information for managing a connection relation between the plurality of computers, and
the second step includes selecting the computer within a predetermined area on the network as the target computer with reference to the connection information.

12. The method of controlling the computer system according to claim 11,
wherein the second step includes selecting, by the processor, at least one computer for correction from among the plurality of computers not included in the predetermined area;
the sixth step includes:
obtaining, by the processor, a correction value associated with the evaluation value from the computer for correction and storing the correction value obtained from the computer for correction in the storing device;
calculating, by the processor, a third point based on the evaluation value of the target computer and the correction value and transmitting the third point to the target computer; and
obtaining the third point from the target computer and storing the third point obtained from the target computer in the storing device;

the seventh step includes calculating, by the processor, a fourth point based on the evaluation value of the own computer and the correction value and storing the fourth point in the storing device; and the eighth step includes calculating, by the processor, the control value based on the first point, the second point, the third point, and the fourth point stored in the storing device.

* * * * *